United States Patent

Naya et al.

[15] 3,672,217
[45] June 27, 1972

[54] COLOR THERMOMETER MEASURING DEVICE

[72] Inventors: Mikio Naya; Haruki Yamaguchi; Izumi Horie, all of Toyokawa, Japan

[73] Assignee: Minolta Camera Kabushiki Kaisha

[22] Filed: June 10, 1970

[21] Appl. No.: 45,125

[30] Foreign Application Priority Data

June 12, 1969 Japan..................................44/46248

[52] U.S. Cl. ..........................................73/355 EM, 356/45
[51] Int. Cl. ......................................................G01j 5/30
[58] Field of Search ..................73/355 R, 355 EM; 356/45

[56] References Cited

UNITED STATES PATENTS 3,539,807  11/1970  Bickel..........................73/355 EM X
3,435,237  3/1969   Collins.............................73/355 R X
3,440,883  4/1969   Lightner............................73/362 SC
2,517,554  8/1950   Frommer.......................73/355 R UX
3,537,314  11/1970  Sret..................................73/355 EM

*Primary Examiner*—Louis R. Prince
*Assistant Examiner*—Frederick Shoon
*Attorney*—Watson, Cole, Grindle & Watson

[57] ABSTRACT

Two individual detecting circuits each of which detects a different spectral range and including a photovoltaic element and a transistor for providing an output signal proportional to the intensity of spectral energy incident on the photovoltaic element. Each output signal is modified by a diode and provided to an input of a differential amplifier composed of a pair of field effect transistors to provide an output representative of the ratio of the spectral energies. The differential amplifier output drives an indicating means to indicate the color temperature.

5 Claims, 6 Drawing Figures

FIG. 3
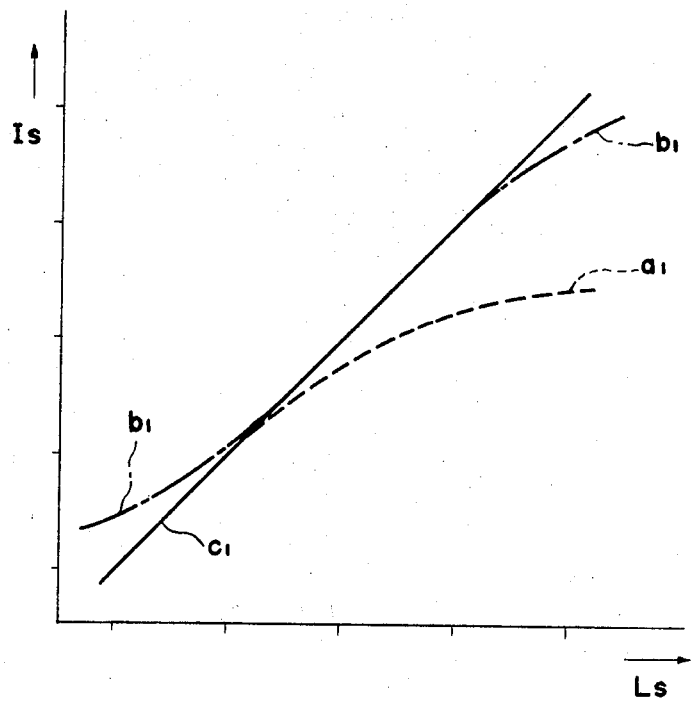
FIG. 4(a)  FIG. 4(b)
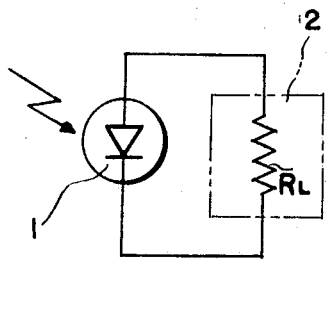 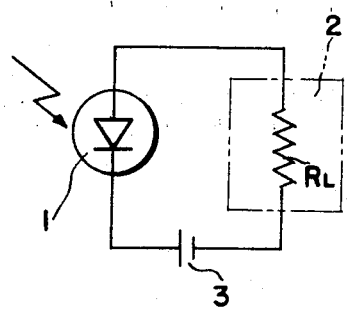

INVENTOR
Mikio Naya
Haruki Yamaguchi
Izumi Horie
BY
Watson, Cole, Grindle & Watson
ATTORNEY

A COLOR THERMOMETER MEASURING DEVICE

BACKGROUND OF THE INVENTION

This invention relates to color temperature measuring devices and more particularly to electronic temperature measuring devices.

Color thermometers for obtaining color temperature from the ratio of spectral energies make use of a photoelectric conversion element and are equipped to detect the ratio or difference produced by a selenium photoelectromotive element having a red filter and a selenium photoelectromotive element having a blue filter by means of a galvanometer connected to the selenium photoelectromotive elements directly or through a resistance and measure the color temperature value from the swing angle of the pointer of said galvanometer. Such known devices may also be equipped to adjust manually the ratio of the light received or the ratio of the light receiving area of the two selenium photo-electromotive elements in order that the galvanometer indicates a given value and thereby obtain the color temperature value. However, in general since the selenium photoelectromotive element has poor sensitivity for a low intensity of illumination the measuring region is limited remarkably, and also since various characteristics such as light fatigue, antecedent error and, the ageing variation are poor, even for a light source of the same color temperature the measuring results are different in accordance with the history of the environmental illumination intensity. In addition, in a color thermometer formed as described above the light receiving area of a selenium photoelectromotive element also is limited, so that the variation of the photoelectric current to the galvanometer is very little, and the ratio of the light receiving quantity or the ratio of the light receiving area also can not be adjusted accurately, therefore, the measuring precision is also poor.

And, when the spectral energy is detected by a photoconductive element such as a CdS cell the necessary sensitivity can be obtained even for a low intensity of illumination and accordingly a large current can be obtained, however, the output current characteristics for the intensity of incoming light vary and it is also difficult to obtain the linearity over a wide region, and the intensity of illumination on the light receiving surface usable for measuring is also limited.

Recently, however, a silicon photoelectromotive element having excellent light fatigue characteristics, antecedent error characteristics, ageing variation characteristics and stability has been developed. Also the silicon photoelectromotive element maintains a linear relation between the intensity of incoming light and the output current, however the output current is small.

SUMMARY OF THE INVENTION

In order to overcome the drawbacks mentioned above, the present invention uses a photoelectric conversion circuit which provides respective output currents proportional to the intensity of two kinds of spectral energies in different wavelength regions of an object light source by means of a silicon photoelectromotive element and generates an output voltage proportional to the logarithm of the output current by means of a diode. A differential amplifier circuit formed by a pair of field effect transistors having gates connected respectively to each of the diodes to detect the output voltage. The color temperature is obtained from the output potential difference of the differential amplifier circuit.

The object of the present invention is to provide a color thermometer which maintains a linear relation between the intensity of incoming light and the output current over a wide region by using a silicon photoelectromotive element. A further object is to enlarge the measuring region while providing high sensitivity and high stability. And yet another object is to improve the poor sensitivity at a low intensity of illumination.

BRIEF DESCRIPTION OF THE DRAWINGS

FIG. 3 is a graph showing the relationship of the current character $(I_S)$ to the intensity $(L_S)$ of incoming light for various loads applied to the silicon photoelectromotive element.

FIG. 4 is a circuit diagram showing a circuit for receiving the current from a photoelectromotive element.

DESCRIPTION OF THE PREFERRED EMBODIMENT

Figure 1:
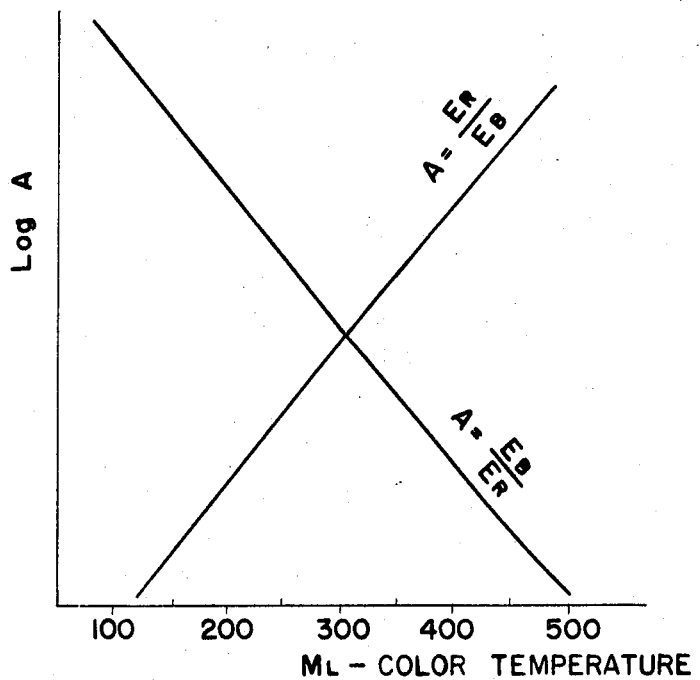
FIG. 1 is a graph showing the relationship between the color temperature $M_L$ of an object light source and the spectral energy ratio.

FIG. 1 shows the well-known relationship between the ratio A of the spectral energies transmitted through each of two color filters each having a different spectral transmittivity and the color temperature $M_L$ of the light source. Ordinate log A denotes ratio $E_B/E_R$ or $E_R/E_B$ which is the ratio of spectral energies $E_R$ transmitted through the red filter to spectral energies $E_B$ transmitted through the blue filter by the logarithm scale. The abscissa denotes the color temperature $M_L$ of the light source by the Mired unit. And the relation-ship shown in FIG. 1 can be expressed by the following well-known formula:

$$f(M_L) = \log \frac{E_B}{E_R} \qquad (1)$$

Therefore, by measuring the ratio $E_B/E_R$ or $E_R/E_B$ of the spectral energies the color temperature $M_L$ of the light source can be obtained.

Figure 2:
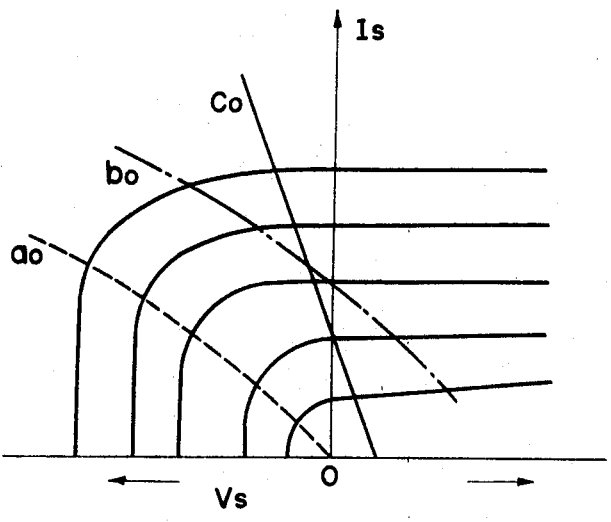
FIG. 2 is a graph showing the relationship between the output voltage $V_S$ of a silicon photoelectromotive element and electric current $I_S$.

FIG. 2 shows the voltage $V_S$ of a silicon photoelectromotive element vs. the current as a function of the intensity of illumination, wherein the ordinate denotes the current $I_S$ converted by the silicon photoelectromotive element and the abscissa denotes the output voltage $V_S$ and the inverse directional impressed voltage.

Figure 5:
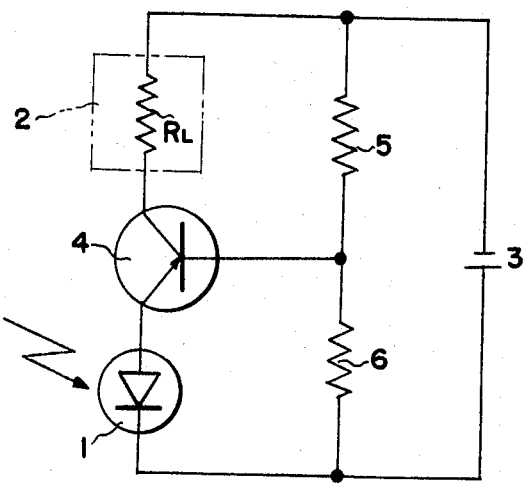
FIG. 5 is a circuit diagram showing a photoelectric conversion circuit used in the present invention.

FIG. 3 shows the relationship between the intensity $L_S$ of incoming light and the output current $I_S$ at the time when the silicon photo-electromotive element is connected as shown in FIG. 4 and FIG. 5.

FIG. 4(a) illustrates the most common circuit for detecting the current produced by a photo-electromotive element, and detection circuit 2 is connected in series to silicon photoelectromotive element 1, and $R_L$ denotes the internal input impedance in the detection circuit 2. When the output current of the silicon photoelectromotive element is detected by such a circuit the output voltage of the silicon photoelectromotive element is generally low, so that the load curve made by the internal input impedance in detection circuit 2 is represented by dotted line $a_o$ shown in FIG. 2 and the output current $I_S$ relative to the intensity $L_S$ of incoming light is represented by dotted line $a_1$ shown in FIG. 3. When the incoming light to the silicon photoelectromotive element becomes stronger the output current will not be proportional proportional to the intensity of incoming light.

And, in order to cancel the effect due to internal input impedance $R_1$ in detection circuit 2 as described above, when power source 3, such as a battery, is connected in series to the silicon photoelectromotive element as shown in FIG. 4(b) the load curve thereof is represented by dotted chain line $b_o$ shown in FIG. 2 and the output current $I_S$ relative to the density $L_S$ of incoming light is improved considerably in the ratio relationship between the intensity of incoming light and the output current as shown by dotted chain line $b_1$ in FIG. 3. However, the leakage current is increased so that when the incoming light is weak the linearity of the intensity of incoming light and the output current becomes worse.

FIG. 5 shows the circuit used for the present invention, wherein reference numeral 4 denotes a transistor, and to the emitter thereof silicon photoelectromotive element 1 is connected and to the collector thereof detection circuit 2 provided with internal input impedance $R_L$ is connected, and resistances 5, 6 are respectively a resistance for dividing the voltage to the base of said transistor 4. The load curve of the silicon photoelectromotive element connected like this is shown by a solid line $C_O$ in FIG. 2, and the output current $I_S$ relative to the intensity $L_S$ of incoming light is shown by a solid line $C_1$ in FIG. 3. Even when the incoming light is strong or even when it is weak the linearity of the output current to the intensity of incoming light is maintained.

That is, the relationship between the intensity of incoming light and the output current can be expressed in general by the following formula:

$$I_S = I_L - I_O \left( \epsilon^{\frac{eV}{kT}} - 1 \right) \quad (2)$$

Wherein, $I_S$ — output current $I_L$ — current proportional to the intensity of incoming light $I_O$ — dark current
$V$ — bias voltage
$k$ — Boltzmann constant
$T$ — absolute temperature
$e$ — electric charge of electron
$\epsilon$ — base of natural logarithm Hereupon, the bias voltage impressed on silicon photoelectromotive element in FIG. 5 is negative, so that $\epsilon eV/kT << 1$ is set up, therefore, provided this term is neglected formula (2) becomes the following formula:

$$I_S = I_L + I_O \quad 3$$

Thereupon, when dark current $I_O$ is small as compared with current $I_L$ proportional to the intensity of incoming light, that is, $I_L >> I_O$, the formula (3) reduces to following formula:

$$I_S = I_L$$

and current $I_S$ is equal to current $I_L$ proportional to the intensity of incoming light, and the intensity of incoming light is in proportion to the output current.

Next, in the case where a diode is connected to the input portion in the detection circuit in FIG. 5, in general there is the following relation between diode current $I_D$ and terminal voltage $V_D$ of the diode:

$$I_D = K_0 \epsilon^{\frac{-qV_g}{kT}} \left( \epsilon^{\frac{qV_D}{kT}} - 1 \right) \quad (4)$$

Wherein:

$K_0$ — constant
$q$ — electric charge of electron
$k$ — Boltzmann constant
$T$ — Absolute temperature
$V_g$ — height of forbidden band In formula (4), 1 is a very small value as compared with $\epsilon q V_D/k_T$ so that by neglecting it and transforming formula (4), $$V_D = K_1 \log I_D + K_2 \quad (5)$$

Wherein, $K_1$ and $K_2$ are a constant respectively.

Hereupon, formula (5) expresses that diode current $I_D$ and diode voltage VD have a logarithmic relationship.

Therefore, the diode current in to the input portion of the detection circuit in FIG. 5 is proportional to the intensity of incoming light onto the silicon photoelectromotive element 1 as described above so that further by transforming formula (5), $$V_{DO} = K_3 \log E + K_4 \quad (6)$$

Wherein, $K_3$ and $K_4$ are a constant respectively and E is the intensity of incoming light. Therefore, in the case where the incoming light onto the silicon photoelectromotive element is spectral energy $E_R$ or $E_B$ as described above, by transforming formula (6)

$$\left. \begin{array}{l} \log E_B = K_5 V_B + K_6 \\ \log E_R = K_5 V_R + K_6 \end{array} \right\} \quad (7)$$

Wherein, $K_5$ and $K_6$ are a constant respectively.

$V_B$ — output voltage of spectral energy $E_B$
$V_R$ — output voltage of spectral energy $E_R$ From formulas (1) and (7)

$$f(M_L) = K_5 (V_B - V_R) \quad (8)$$

Formula (8) indicates that the color temperature $M_L$ of a light source can be obtained by measuring the terminal voltage of the diode produced by the output current of the silicon photoelectromotive element produced by spectral energy $E_R$ and $E_B$, namely, the difference of the terminal voltage of the diodes, in the input portion of the detection circuit at the time when each of the spectral energies $E_R$, $E_B$ is detected by such a photoelectric conversion circuit as shown in FIG. 5.

And, in the present invention, a silicon photoelectromotive element is provided so as to detect respectively two kinds of spectral energies of different spectral distribution based on the principle described above, and the silicon photoelectromotive element is connected to a circuit in which the output current of the element is proportional to the intensity of the spectral energy. A differential amplifier is formed by a pair of field effect transistors to the gates of which a diode provided so as to generate the voltage proportional to the logarithm of the output current of the silicon photoelectromotive element is connected respectively. Such a signal may be used to drive an indicator or operate a servomechanism. In general, a field effect transistor has a very high input impedance so that it is possible to detect the voltage produced by the diode without exerting an effect upon the relation between the output current of the silicon photoelectromotive element and its terminal voltage.

Figure 6:
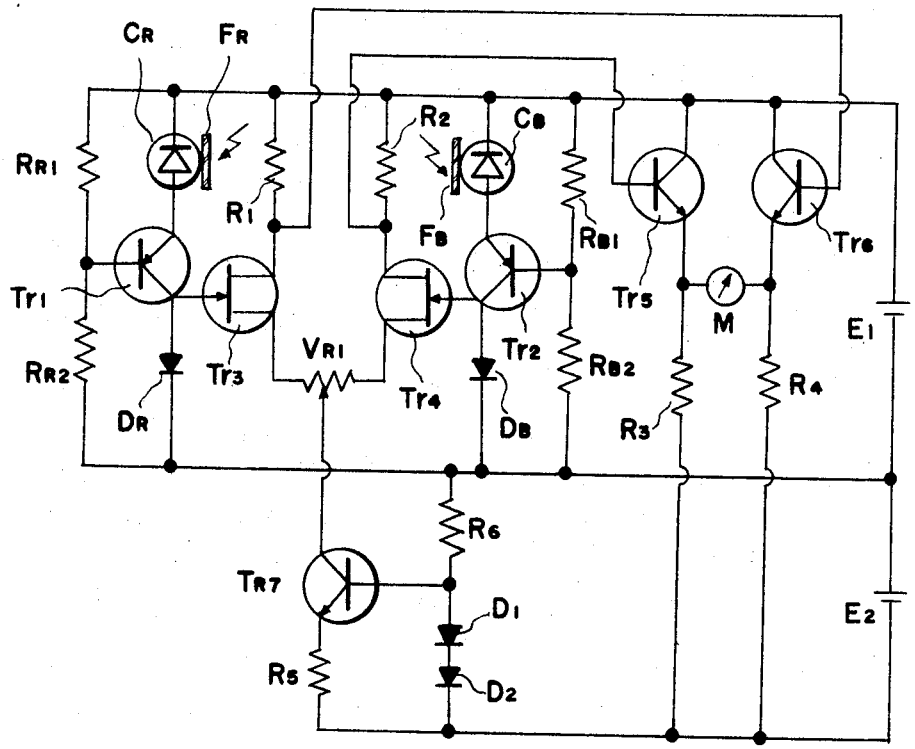
FIG. 6 is an electric circuit diagram of an alternative embodiment in accordance with the present invention.

FIG. 6 shows the electric circuit of embodiment formed so as to directly measure the color temperature of a light source by positioning the scale of a pointer in accordance with the present invention.

In said FIG. 6, $F_R$ denotes a red filter for transmitting the spectral energy of a red wavelength and $F_B$ denotes a blue filter for transmitting the spectral energy of a blue wavelength $C_R$ is a silicon photoelectromotive element positioned to receive the spectral energy transmitted through the red filter $F_R$ and $C_B$ is a silicon photoelectromotive element positioned to receive the spectral energy transmitted through the blue filter $F_B$. Transistor $T_{r1}$, diode $D_{R1}$ and resistances $R_{R1}$, $R_{R2}$ form a photoelectric conversion circuit for generating a voltage proportional to the logarithm of the intensity of the spectral energy transmitted through silicon photo-electromotive element $C_R$ and red filter $F_R$, as described above. And in the same way, transistor $T_{r2}$, diode $D_B$, and resistances $R_{B1}$, $R_{B2}$ form a photoelectric conversion circuit for generating a voltage proportional to the logarithm of the intensity of the spectral energy transmitted through blue filter $F_B$.

$T_{r3}$ and $T_{r4}$ are field effect transistors forming a differential amplifier circuit, and to the gates thereof a respective diode $D_R$ or $D_B$ is connected.

Resistances $R_1$, $R_2$ are connected to the drains of field effect transistors $T_{r3}$, $T_{r4}$ to provide an output of the differential amplifier circuits formed by field effect transistors $T_{r3}$, $T_{r4}$.

Transistors $T_{r5}$, $T_{r6}$ are connected in a common collector circuit and receive as an input the output voltage produced by resistances $R_1$, $R_2$.

Resistances $R_3$, $R_4$ are resistances for providing the output voltage of the common collector circuit, and indicator M indicates the color temperature in accordance with the output voltage. The common collector circuit is provided so that the differential amplifier circuit is not affected because of its character of high input impedance and low output impedance.

$E_1$ and $E_2$ are power source batteries and variable resistance $V_{R1}$ enables the adjustment of the operating characteristics of field effect transistors $T_{r3}$, $T_{r4}$.

Transistor $T_{r7}$ is a transistor which forms a constant current circuit together with resistances $R_5$, $R_6$ and diodes $D_1$, $D_2$.

In the circuit formation described above, provided that the output voltage produced by diodes $D_R$, $D_B$ by the output current of silicon photoelectromotive elements $C_R$, $C_B$ for a light source having a given color temperature $M_O$ and light intensity $L_O$ is $V_R$ volt and $V_B$ volt, and each gate source voltage of field effect transistors $T_{r3}$, $T_{r4}$ is $\alpha$ volt and the drain current of field effect transistors $T_{r3}$, $T_{r4}$ is $i_R$, $i_B$, the output potential difference $V_{12}$ of the differential amplifier circuit can be expressed by the following formula:

$$V_{12} = i_R r_1 - i_B r_2 \quad (9)$$

Wherein, $r_1$ — resistance value of resistance $R_1$
$r_2$ — resistance value of resistance $R_2$ Whereupon, if the color temperature is $M_O$ and not variable, and a light source has light intensity $L_1$ instead of $L_O$, it is obvious that formula (7) becomes:

$$V_R - V_B = \text{constant}$$

Therefore, the output voltage $V_R + \Delta V$, $V_B + \Delta V$ of diodes $D_R$, $D_B$ has the same variation quantity $\Delta V$, and accordingly each gate source voltage of field effect transistors $T_{r3}$, $T_{r4}$ is $\alpha - \Delta V$. For example, when the variation quantity $\Delta V$ is positive the drain current of field effect transistors $T_{r3}$, $T_{r4}$ is apt to increase, however, at this moment, in the constant-current circuit the collector emitter voltage of transistor $T_{r7}$ is changed so that the collector current of transistor $T_{r7}$, namely, the sum of drain current of field effect transistors $T_{r3}$, $T_{r4}$ does not undergo a change, and accordingly each gate source voltage of field effect transistors $T_{r3}$, $T_{r4}$ is maintained at $\alpha$, therefore the output potential difference of the differential amplifier circuit does not change even with changes in light intensity, and the indication of indicator M also does not undergo a change.

On the other hand, for a light source having a different color temperature than color temperature $M_O$ the output voltage of diodes $D_R$, $D_B$ is different so that the indication also undergoes a change and the indication corresponding to the color temperature of the light source can be obtained.

And, by graduating the scale of the indicator with the color temperature a color thermometer of the direct scale reading type not affcted by the light intensity of an object light source can be obtained.

Although, the output voltage variation of a diode is relatively large temperature, however because of the differential amplifier circuit connection only the difference of the temperature characteristics between two diodes exerts an effect upon the measuring precision. Therefore, if the diodes have matched temperature characteristics, the circuit in accordance with the present invention is able to obtain a stabilized indication affected scarcely by the temperature.

In addition, the present invention is not limited to the aforementioned embodiment and the embodiment described hereinafter is also included as well.

That is, in the aforementioned embodiment is a two-color thermometer which utilizes color filters of two colors- red and blue, however, the blue filter side can be so formed that a blue and a green filter are exchangeable with each other, or it is also possible to form a three-color thermometer for measuring the color temperature in combination with two kinds of color filters such as a red filter and a blue filter, and a red filter and a green filter, by providing separately a silicon photoelectromotive element having on the front a green filter and forming a circuit so as to select alternatively each of the respective silicon photoelectromotive elements.

And, it is also possible to divide the measuring region for color temperature into many parts to improve the reading precision by changing the ratio of the intensity of light received by a silicon photoelectromotive element by providing an incoming light control member such as a ND filter on the front of one or both of the silicon photoelectromotive elements $C_R$, $C_B$, or by changing one or both of resistances $R_1$, $R_2$ connected to the drain of field effect transistors $T_{r3}$, $T_{r4}$ forming the differential amplifier circuit.

And further, it is also possible to read the color temperature corresponding to the adjusting quantity by detecting the output potential difference of the differential amplifier circuit by means of a balance meter and adjusting the ratio of the intensity of incoming light to the silicon photoelectromotive elements $C_R$, $C_B$ so as to balance the balance meter. And also, by providing a servomechanism operated by the output potential difference of the differential amplifier circuit instead of the balance meter, and adjusting the ratio of the intensity of incoming light or the resistance value of the output resistance $R_1$, $R_2$ automatically by means of the servo-mechanism it is also possible to read the adjusting quantity as the rotation angle of the servomotor.

According to the present invention disclosed above, since a silicon photoelectromotive element having various good characteristics such as light fatigue, antecedent error, and ageing variation is put to use, a stabilized and highly reliable measurement can be effected. Also as the output current of the silicon photoelectromotive element is detected by the photoelectric conversion circuit including transistors the linearity of the output current for the intensity of incoming light can be obtained covering a wide range even in the case where the incoming light is weak.

And, by the differential amplifier circuit formed by the field effect transistors the output voltage of the diodes proportional to the logarithm of the output current of the silicon photoelectromotive element is amplified and then the difference thereof is detected and yet the measuring error due to temperature changes is reduced. Thus because of the constant current circuit there is no effect caused by the light intensity of the light source to be measured and the high precision and high sensitivity of the measurement is not effected.

We claim:
1. A color temperature measuring device, comprising:
   two detecting circuits for detecting spectral energies in respectively different spectral bands, each of said detecting circuits including a photovoltaic element and a transistor connected thereto for providing an output signal proportional to the intensity of spectral energy incident on said photovoltaic element;
   a diode in each circuit responsive to each output signal connected so as to produce a signal proportional to the logarithm of each of said output signals;
   a differential amplifier circuit including a pair of field effect transistors each having a gate connected across a respective one of said diodes to provide an output representative of the ratio in said spectral energies; and
   an indicating means for indicating color temperature in response to said output.

2. A color temperature measuring device as set forth in claim 1, further comprising means for generating a reference voltage; each of said detecting transistors includes an emitter connected to said photovoltaic element, a collector connected to both a respective one of said diodes and gates of said field effect transistors, and a base connected to said reference voltage.

3. A color temperature measuring device as set forth in claim 1, further comprising a control circuit for supplying a constant current to said field effect transistor source electrodes.

4. A color temperature measuring device as set forth in claim 3, wherein said control circuit includes a constant voltage source and a tranSistor having a base connected thereto, and a collector connected to both sources of said field effect transistors.

5. A color temperature measuring device as set forth in claim 1, wherein said indicating means includes a second differential amplifier circuit having a pair of transistors, each transistor having a base connected to the output of said first differential amplifier circuit, a collector grounded, and an emitter forming an output of said second differential amplifier circuit, and said indicating means further includes a galvanometer connected to said emitters.

* * * * *

UNITED STATES PATENT OFFICE
CERTIFICATE OF CORRECTION

Patent No. 3,672,217      Dated June 27, 1972

Inventor(s) Mikio Naya et al.

It is certified that error appears in the above-identified patent and that said Letters Patent are hereby corrected as shown below:

The Title should read:

-- A Color Temperature Measuring Device --

Signed and sealed this 29th day of May 1973.

(SEAL)
Attest:

EDWARD M. FLETCHER, JR.
Attesting Officer

ROBERT GOTTSCHALK
Commissioner of Patents